United States Patent [19]
Boyce

[11] Patent Number: 4,758,890
[45] Date of Patent: Jul. 19, 1988

[54] QUANTIZING TELEVISION HORIZONTAL PHASE TO SUBCARRIER ZERO CROSSINGS

[75] Inventor: Rory W. Boyce, Fair Oaks, Calif.

[73] Assignee: The Grass Valley Group, Inc., Grass Valley, Calif.

[21] Appl. No.: 37,366

[22] Filed: Apr. 13, 1987

[51] Int. Cl.⁴ .............. H04N 5/04; H04N 9/44; H04N 9/475

[52] U.S. Cl. .................... 358/148; 358/17; 358/19; 358/319; 358/326

[58] Field of Search .............. 358/10, 17, 19, 148, 358/150, 153, 319, 320, 326, 337; 375/118, 119, 120, 23, 121; 370/10

[56] References Cited

U.S. PATENT DOCUMENTS

| | | | |
|---|---|---|---|
| 4,339,770 | 7/1982 | Dennison et al. | 358/19 |
| 4,468,687 | 8/1984 | Munezawa et al. | 358/19 |
| 4,587,551 | 5/1986 | Penney | 358/10 |
| 4,603,346 | 7/1986 | Melling, Jr. | 358/10 |
| 4,672,448 | 6/1987 | Gioisa | 358/148 |

Primary Examiner—James J. Groody
Assistant Examiner—Michael D. Parker
Attorney, Agent, or Firm—Francis I. Gray

[57] ABSTRACT

A circuit for quantizing television horizontal phase to subcarrier zero crossings has a voltage variable delay circuit to delay the leading edges of incoming horizontal pulses to produce a delayed horizontal pulse output. The corresponding leading edges of the delayed horizontal pulse output are input to the clock input of a flip-flop to store the level of a square wave input which has a given transition (high to low, for example) for each zero crossing of the subcarrier. The stored levels are integrated to produce an error signal which is used to delay the leading edges of the incoming horizontal pulses so that the leading edges of the delayed horizontal pulse output are time quantized within a narrow window at a subcarrier zero crossing.

3 Claims, 2 Drawing Sheets

QUANTIZING TELEVISION HORIZONTAL PHASE TO SUBCARRIER ZERO CROSSINGS

BACKGROUND OF THE INVENTION

The present invention relates to television subcarrier to horizontal sync phase circuits, and more particularly to a circuit for quantizing television horizontal phase to subcarrier zero crossings to assure that horizontal sync pulse leading edges occur at the extrapolated zero crossings of the subcarrier burst.

NTSC composite color video signals contain not only picture information (luminance and chrominance), but also timing information (vertical and horizontal sync pulses) and other reference information (equalizing pulses and color burst). The horizontal sync pulse and the color burst occur during the horizontal blanking interval of each scan line. In accordance with the Electronics Industries Association (EIA) standard RS-170A the start of the color burst is defined by the zero crossing (positive or negative slope) that precedes the first half cycle of the subcarrier. The reference subcarrier from the color burst is used in a television receiver to control a phase locked oscillator which generates a continuous wave at subcarrier frequency in order to extract the chrominance information from the composite video signal. In accordance with RS-170A the zero crossing of the extrapolated color burst, i.e., the continuous wave at subcarrier frequency and in phase with the color burst, must be coincident with the sync point, i.e., the fifty percent point on the leading edge of the horizontal sync pulse. Although the slope of the zero point from field to field in the NTSC format changes, the zero point of the extrapolated subcarrier must maintain that coincidence.

What is desired is a circuit for automatically assuring the correct phase relationship between the extrapolated subcarrier frequency zero crossings and horizontal sync.

SUMMARY OF THE INVENTION

Accordingly the present invention provides a circuit for quantizing television horizontal phase to subcarrier zero crossings to assure that the horizontal sync leading edges occur at the extrapolated color burst zero crossings. Incoming horizontal pulses corresponding to the horizontal sync pulses are input to a voltage variable delay circuit. The delayed horizontal pulse output from the voltage variable delay circuit clocks a D-type flip-flop having a two times subcarrier frequency square wave input with a given transition (high to low, for example) at each subcarrier zero crossing. The output of the flip-flop is input to an integrator to generate a voltage error signal which is input to the voltage variable delay circuit to delay the incoming horizontal pulses so that the leading edges of the delayed horizontal pulse output are essentially coincident with one of the given transitions of the square wave input.

The objects, advantages and novel features of the present invention will be apparent from the following detailed description when read in conjunction with the appended claims and attached drawing.

DESCRIPTION OF THE PREFERRED EMBODIMENT

Figure 1:
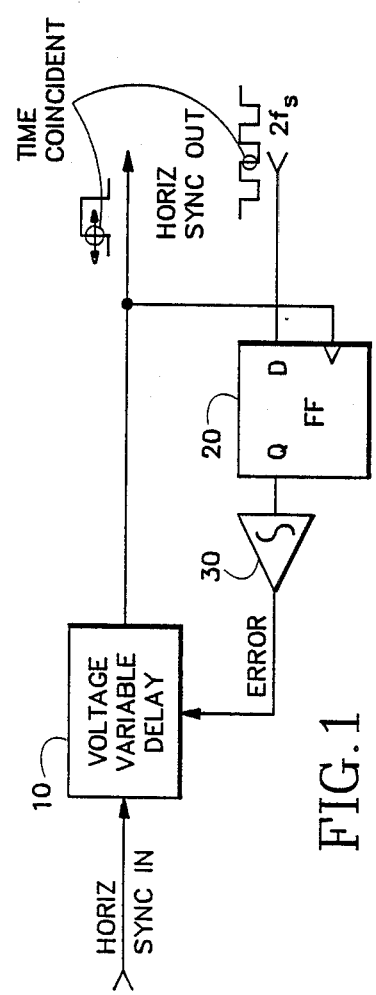
FIG. 1 is a block diagram view of a circuit for quantizing television horizontal phase to subcarrier zero crossings according to the present invention.

Referring now to FIG. 1 incoming horizontal sync pulses corresponding to horizontal sync pulses from a television composite sync signal are input to a voltage variable delay circuit 10. The delayed horizontal pulse output from the voltage variable delay circuit 10 is input to the clock input of a D-type flip-flop 20. A two times subcarrier frequency square wave signal, $2f_s$, is input to the D input of the flip-flop 20. The Q output of the flip-flop 20 is input to an integrator circuit 30 which integrates the Q output about its nominal half amplitude point. The output of the integrator circuit 30 is an ERROR signal which is input to the voltage variable control circuit 10 to control the delay of the incoming horizontal pulses.

Figure 2:
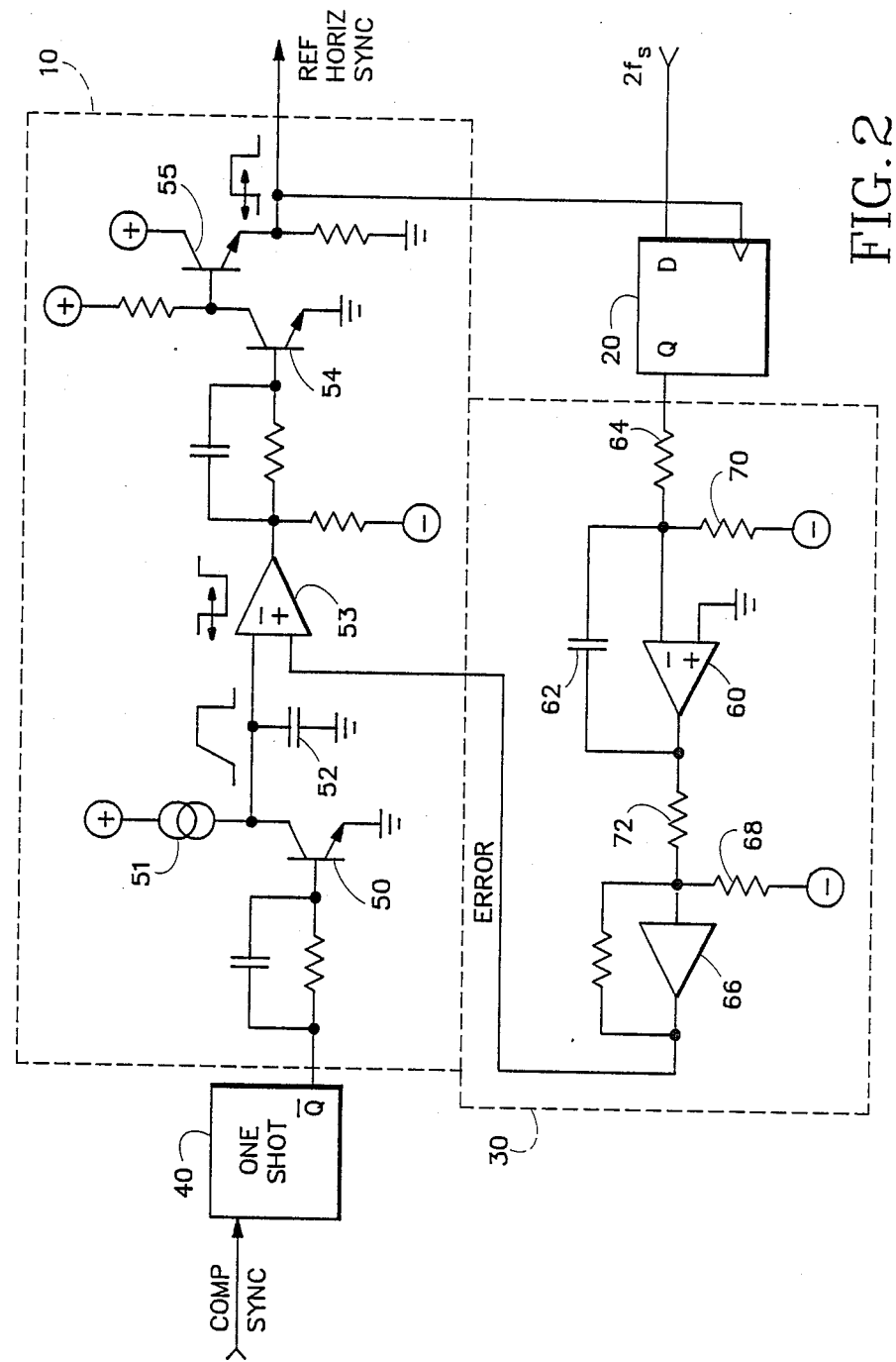
FIG. 2 is a schematic diagram view for the block diagram of FIG. 1.

As shown in greater detail in FIG. 2 the composite sync signal containing both horizontal and vertical sync pulses is input initially to a one-shot multivibrator 40 to separate the horizontal sync pulses from the vertical sync pulses and produce the incoming horizontal pulses. The one-shot 40 is triggered by the leading edge of the horizontal sync pulses, and has a timeout period greater than one-half of a scan line so that only incoming horizontal pulses corresponding to the horizontal sync pulses output at the /Q output. The /Q output of the one-shot 40 is input to the base of a ramp transistor 50, the emitter of which is grounded. The collector of the ramp transistor 50 is connected to a current source 51 and to one terminal of a ramp capacitor 52, the other terminal of which is grounded. The collector of the ramp transistor 50 also is input to the inverting input of a comparator 53. The ERROR signal from the integrator circuit 30 is input to the non-inverting input of the comparator 53. The output of the comparator 53 is input to the base of an amplifier transistor 54, the collector of which is input to the base of a buffer transistor 55. The output at the emitter of the buffer transistor 55 is the delayed horizontal pulse output which is input to the clock input of the flip-flop 20.

The output of the flip-flop 20 is input to the inverting input of an operational amplifier 60 configured as an integrator, the non-inverting input being grounded. An integrating capacitor 62 is connected between the inverting input and the output of the operational amplifier 60 and has a capacity which, when combined with an input resistor 64, produces a long time constant to perform the integration function. Resistor 70 at the junction of capacitor 62 and resistor 64 provides a current summation point to assure that the integration takes place about the half amplitude point of the output of flip-flop 20. The integrated output from the operational amplifier 60 in the form of a slowly varying voltage level is input to a buffer amplifier 66, the output of which is the ERROR voltage for controlling the voltage variable delay circuit 10. Resistor 68 at the input of the buffer amplifier 66 provides an offset for the ERROR voltage to center on the ramp slope input to the other input of the comparator 53. Also resistor 72, connected between the output of the operational amplifier 60 and the input of the buffer amplifier 66, is used to set the gain of the buffer amplifier.

Figure 3:
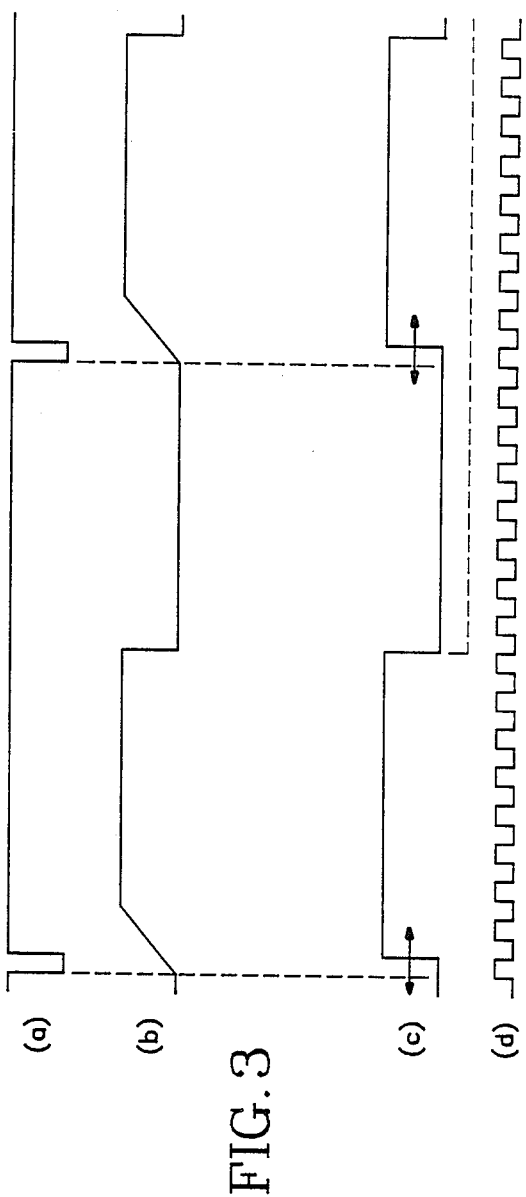
FIG. 3 is a timing diagram view for the schematic view of FIG. 2.

In operation the composite sync, a portion of which is shown at FIG. 3(a), produces at the output of the one-shot 40 a negative level for each leading edge of the horizontal sync pulses which lasts until the timeout period is completed. At that time the output of the one-shot 40 returns to a positive level. The negative level from the one-shot 40 cuts off the ramp transistor 50, causing the collector to go from negative toward positive. The transition at the collector of the ramp transistor 50 is in the form of a ramp due to the charge time of the ramp capacitor 52. The current source 51 assures that the ramp capacitor 52 charges linearly. After the timeout period of the one-shot 40, the ramp transistor 50 turns on, producing a sharp transition from positive to negative at the collector. The output of the ramp transistor 50 is shown at FIG. 3(b) in relation to the composite sync signal of FIG. 3(a). The output of the ramp transistor 50 is compared with the ERROR signal from the integrator circuit 30 in comparator 53 which results in a signal having time variable leading edges corresponding to the leading edges of the horizontal sync pulses. The output of the comparator 53 is amplified and buffered by transistors 54, 55 to produce the delayed horizontal pulse output shown at FIG. 3(c).

At each variable rising edge of the delayed horizontal pulse output from the voltage variable delay circuit 10 the flip-flop 20 is clocked and stores the state at that instant of the $2f_s$ square wave shown in FIG. 3(d). The integration of the output of the flip-flop 20 by the integrator circuit 30 has a long time constant so that the ERROR signal does not change very much between horizontal sync pulses. The ERROR signal adjusts the delay produced by the voltage variable delay circuit 10 such that, if the $2f_s$ square wave is high when stored, the delay increases and, if the $2f_s$ square wave is low when stored, the delay decreases. Since the $2f_s$ square wave is twice the frequency of the subcarrier, each transition from high to low of the square wave occurs at a zero crossing of the subcarrier. Therefore the flip-flop output becomes a low frequency square wave as the circuit hunts back and forth about a predetermined transition (high to low, for example) of the $2f_s$ square wave corresponding to the subcarrier zero crossing, resulting in the delayed horizontal pulse output being time quantized within a narrow window at a subcarrier zero crossing.

Thus the present invention provides a circuit for quantizing television horizontal phase to subcarrier zero crossings by varying the delay of the horizontal sync signal according to an integrated error signal generated by clocking a $2f_s$ square wave by the delayed leading edge of the horizontal sync signal.

What is claimed is:

1. A circuit for quantizing horizontal phase to subcarrier zero crossings comprising:
   means for variably delaying the leading edges of incoming horizontal pulses corresponding to horizontal sync pulses to produce a delayed horizontal pulse output having delayed leading edges; and
   means for generating an integrated error signal based upon the coincidence of the delayed leading edges of the delayed horizontal pulse output with a square wave having a given transition occurring at each zero crossing of the subcarrier, the error signal being input to the variably delaying means to control the delay of the leading edges of the incoming horizontal pulses so that the delayed leading edges occur within a narrow window about the given transiston.

2. A circuit as recited in claim 1 wherein the generating means comprises:
   a flip-flip having the square wave as an input, the flip-flop being clocked by the delayed leading edges such that the level of the square wave is stored by each delayed leading edge; and
   means for integrating the stored level from the flip-flop to generate the integrated error signal.

3. A circuit as recited in claim 1 wherein the variable delaying means comprises:
   means for providing a comparison pulse having a ramped leading edge corresponding to the leading edges of the incoming horizontal pulses;
   means for comparing the comparison pulse with the integrated error signal to produce the delayed leading edges of the delayed horizontal pulse output.

* * * * *